United States Patent [19]

Rieger et al.

[11] Patent Number: 4,690,763

[45] Date of Patent: Sep. 1, 1987

[54] FILTER MEDIUM IN THE FORM OF A STABLE POROUS BODY

[75] Inventors: Wolfhart Rieger, Buch; Ludwig Gauckler, Schaffhausen; Albert Maurer, Thayngen; Konrad Kampfer, Thayngen, all of Switzerland

[73] Assignee: Swiss Aluminium Ltd., Chippis, Switzerland

[21] Appl. No.: 766,053

[22] Filed: Aug. 15, 1985

Related U.S. Application Data

[63] Continuation-in-part of Ser. No. 426,902, Sep. 29, 1982, abandoned.

[51] Int. Cl.$^4$ ............................................. B01D 39/20
[52] U.S. Cl. ................................... 210/496; 210/510.1
[58] Field of Search ........................... 264/43; 55/523; 210/510.1, 496

[56] References Cited

U.S. PATENT DOCUMENTS 3,524,548  8/1970  McDonald et al. ......... 210/510.1 X
4,407,967 10/1983  Luks ................................ 264/43 X

FOREIGN PATENT DOCUMENTS 1092543 12/1959 Fed. Rep. of Germany ... 210/510.1

Primary Examiner—Frank Spear
Attorney, Agent, or Firm—Bachman & LaPointe

[57] ABSTRACT

Filter medium in the form of a stable porous body of granules of spherical form bonded together by a different phase or by sintering. Preferably hollow spherical granules of corundum are manufactured into filter media in plate form. The filter media are employed for filtration of molten metal preferably aluminum.

18 Claims, No Drawings

FILTER MEDIUM IN THE FORM OF A STABLE POROUS BODY

CROSS REFERENCE TO RELATED APPLICATION

This application is a continuation-in-part of application Ser. No. 426,902, filed Sept. 29, 1982, now abandoned.

BACKGROUND OF THE INVENTION

The present invention relates to a filter medium in the form of a stable porous body of granules of a fire-resistant material bonded together.

From U.S. Pat. No. 3,524,548 there is known a rigid porous filter for filtration of molten aluminum, which consists of a first granulate-like fire-resistant material, which is not attacked by molten aluminum, and which has a binder a glass-like material, which contains not more than 10% silicates.

As granulate there is mentioned "fused alumina" or "tabular alumina". With "fused" or "tabular alumina" one is dealing with fused corundum broken into pieces. This material produces a filter with relatively slight permeability and porosity. The filter effectiveness and filtering capacity is restricted by the internal structure. For this reason in practice bundles of filter tubes are normally installed, in order to achieve the desired amounts of flow.

It is also known from German OS No. 22 27 029 that such kinds of rigid filter elements, for example in the form of tubes, are very fragile.

It can be assumed that this fragility has its basis at least partially in the fact that in the firing process unavoidable stresses and consequential points of fracture arise. Additionally disadvantageous is the high weight of the filter elements according to U.S. Pat. No. 3,524,548 and the long preparatory heating up time thereby caused, before the molten aluminum can be directed through the filter element.

For the start of the filtration and also during the filtration relatively large pressure differences must prevail, in order to drive the molten aluminum through the filter element.

By means of a filter element of an entirely different kind an attempt has been made to eliminate the disadvantages, such as great pressure differences during filtration and restricted filtering capacity. In Swiss Pat. specification No. 622 230 a filter element is described, which is manufactured by impregnation of a polyurethane foam with a ceramic suspension, pressing out of the excess suspension, drying and firing. According to this method one obtains an approximate replica of the original organic foam in rigid ceramic form. Filter elements of this kind have a high filtering capacity and high rates of through flow, and thus enable themselves to be employed in the form of simple filter plates. There is inherent in these filter elements the disadvantage that they are expensive in manufacture.

U.S. Pat. No. 4,278,544 discloses a filter medium for fluid, which is a sintered body in which alumina refractory is 100 parts by weight, more than 95% by weight of said refractory being pelletized spheroids of less than 1.0 mm in particle size, while inorganic binder having particle size less than 40 microns is in the range 15-30 parts by weight and fluoride and/or oxide of lithium is in the range 0.1-1 part by weight, and in which filter medium the mean pore diameter is in the range 500-1 microns and the porosity is in the range from 15 to 40%. The refractory material is selected from the following materials: alumina, corundum, mullite, bauxite, diaspora and sillimanite. Filter plates manufactured in accordance with the U.S. Pat. No. 4,278,544 suffer from a number of disadvantages. Firstly, the respondant filter plates would be extremely heavy, for example, a 17"×17"×1" plate would weigh about 11,698 grams as compared to about 3878 grams for a similarly sized filter in accordance with the present invention. Thus, the filter plate would be difficult to handle. Secondly, and more important, filter plates of the size set forth above would fracture under the weight of the metallostatic head is used to filter molten metal.

The object of the present invention is to overcome the disadvantages mentioned and to provide a filter plate, which can be manufactured easily and in consistent quality, that has a good filtering efficiency, is well wetted by the material to be filtered, possesses a high filtered capacity and is easy to use.

SUMMARY OF THE INVENTION

According to the invention, the foregoing object is attained with a filter plate for filtering molten metal in the form of a stable porous body of hollow spherical ceramic granules of fire-resistant material which are bonded together, said granular having a mean diameter of from about 0.5 mm to 8 mm and are thermally bonded together such that the surface area of the point contact between any two granules is from about 0.1% to 1.5% the surface area of the granules, said filter plate being characterized by a width to thickness ratio of from about 1:1 to 25:1, an apparent density of about 16 to 25 percent the density of the ceramic material, a through flow porosity of about 20 to 35 percent by volume and a permeability of about 10 $\mu$Pm to 30 $\mu$Pm.

DETAILED DESCRIPTION

The porosity serves to express, how large are the spaces which can be flowed through, between the spheres, reckoned on the total volume of a filter body. As a space is designated only the space delimited by the exterior curves of the grains but without possible cavities in the interiors of the grains. According to the invention the porosity amounts to 5 to 45% by volume, suitably 20 to 40% by volume and preferably 20 to 35% by volume.

The permeability required according to the invention is measured according to DIN standard 51058, and in the present case is expressed in microperm ($\mu$Pm).

In the present invention the values for permeability amount to 2 to 200 $\mu$Pm, suitably 2 to 50 $\mu$Pm and preferably 10 to 30 $\mu$Pm.

The granules of fire-resistant material have a spherical shape or an approximately spherical shape. However lens-shaped or drop-shaped granules can also be used within the meaning of the invention. According to the method of manufacture for such granules mixtures of different external shapes can also be obtained. The granules can exist in solid or preferably hollow form, where the fire-resistant material in this case constitutes only an outer shell, but structures can also be employed built up of concentric shells or from a plurality of cells individually open or closed, which are bounded externally by a shell. The shells are not obliged to be continuously impervious. Porosities or points of fracture in the shells, occurring even at random, by subsequent breaking down of granules provided in spherical form can be employed within the scope of the invention. These different kinds of granules, that is to say solid spherical, hollow spherical or broken granules can be mixed in any proportions. As fire-resistant material, the ceramic materials familiar to the expert can be employed. Selection is governed in the first place according to the requirements, which the material to be filtered imposes on the filter as regards chemical stability, heat resistance, rigidity, durability, formability and wettability.

Among the materials suitable for employment there are metallic oxides, such as aluminum oxides, for example as corundum, boehmite, hydrargillite or bauxite, SiO2, e.g. perlite; silicates, such as mullite, aeromullite, sillimanite or chamotte; then magnesium oxides and magnesium silicates, such as steatite, forsterite, enstatite and cordierite, as well as dolomite and mixtures of the oxides mentioned.

As further metallic oxides there are zirconium oxide, stabilized or unstabilized in monoclinic, tetragonal and/or cubic form; tin oxide with or without doping; aluminum titanate, calcium silicates, calcium-magnesium-silicates, magnesium-aluminum-silicates, zirconium silicates, calcium aluminates, iron-chromium-oxides, aluminum hydroxides, high melting point glasses, boron carbide, titanium carbide, titanium diboride and zirconium diboride, silicon carbide, silicon nitride and its mixed crystals, and also all spinels and perowskites. To be reckoned on with as fire-resistant materials there are in the present case also carbon, especially in the form of graphite, coke or pitch and also their mixtures.

Suitably the granules of fire-resistant materials include aluminum oxides, preferably as corundum or bauxite; zirconium oxide or spinels.

Mixtures of various individual components in differing proportions can also be used.

Spherical-shaped fire-resistant material is manufactured in a manner known per se. As a rule one obtains spherical granules by roll granulation, spray granulation or by atomizing and sintering thereafter.

The manufacture of hollow spheres is also known.

One can blow a stream of material to be cast, for example of liquid corundum, by means of compressed air or steam. In so doing one obtains hollow spheres of up to 5 mm diameter.

Once can however also by means of a gas phase operation subject a blowable slip, which for example contains very finely divided high melting point oxides and either substances yielding carbon dioxide, or hydrogen peroxide, as blowing agent, to a mechanical dispersion, suitably by dripping and/or blowing, and drying and firing the resulting drops.

In similar manner, one can manufacture spherical granules by the known sol-gel method.

The granules of spherical shape have a mean diameter of 0.1 to 30 mm. The minimum granule size should amount to 0.08 mm, the maximum granule size to 36 mm.

The suitable mean granule diameter amounts to 0.5 to 8 mm, with a minimum granule size of 0.4 mm and a maximum granule size of 9 mm.

Preferably hollow spherical granules are employed with a mean diameter of 0.5 to 5 mm.

The granules are so bonded together that a point of connection between two granules requires 0.1 to 15%, suitably 0.1 to 5%, preferably 0.5 to 1.5% of the surface of that sphere. For spherical-like granules such as lens-shaped or drop-shaped granules, the same percentage amount of the outer surface similarly applies. In all cases the data applies to the calculated surface, which results from the mean radii of the granules and not from a special microsurface which can result from the internal structure of the fire-resistant material.

The connection of the granules together can take place in various ways. The granules can be bonded by a different phase, which has a chemical character, where one can employ phosphates, such as aluminum orthophosphate, phosphoric acid, magnesium orthoborate, aluminum hydroxychloride and/or silica gel.

Furthermore they can be ceramically bonded by glasses, for example silicate or boron glasses and/or by the employment of glass-forming substances or by very finely divided material applied to the surface, which corresponds in its composition to the heat-resistant material in question. An example for the last embodiment would be corundum spheres, which are coated or mixed with a very finely divided amorphous aluminum oxide powder in the angstrom range. The very finely divided powder sinters at low temperatures into coarsely granuled powder and is thereby able to form a body which is homogeneous as to material, rigid and high refractory.

By suitable choice of granules and choice of a ceramic binder, a body which is homogeneous as to material can also be achieved in that the binder and the fire-resistant material enter into mutual reaction and by formation of a new highly refractory material produce a highly refractory bonding.

It is also possible to bond the granules together without addition of a different phase. The granules are simply sintered together into mutual bonding.

The filter media can be modified according to their purposes of use.

By coating of the free granule surface within the filter medium with activated aluminum oxide, with the activated aluminum oxide amounting to 3 to 40% by weight of the total filter medium, a BET surface of at least 10 $m^2/g$ can be achieved.

For this purpose the filter medium is suitably coated with a slip of activated $\beta$ or $\alpha$- alumina, preferably $\gamma$ - alumina as raw material, and a small quantity of binder, for example colloidal silicic acid, and then activated.

The filter medium can be coated with carbon, with the carbon amounting to 3 to 40% by weight of the total filter medium. By carbon can be understood also coke, pitch and graphite.

A further possibility lies in coating the free granule surfaces of the filter medium alone or in addition to other treatments with 0.5 to 10% by weight, reckoned on the total weight of the filter medium, with a flux for metals.

Salts such as chlorides or fluorides serve as fluxes for metals. For example for aluminum $Na_3AlF_6$, NaCl, KCl, $CaF_2$, $AlCl_3$, LiF or their mxitures are employed.

A further advantageous embodiment lies in that ceramic fibers are contained in the fire-resistant material or on the granule surface in quantities of 0.01 to 10% by weight reckoned on the quantity of fire-resisting material, and the ceramic fibers extend out beyond the granule surface with at least one of their fiber ends.

As ceramic fibers there can be used fibers of aluminum oxides, aluminum silicates, zirconium oxides, boron, silicon carbide or carbon. Within the scope of the present invention, there also lie all naturally occurring mineral fibers.

The filter structure can be arranged in different ways. It is possible to maintain a homogeneous distribution of granules through an entire filter element. One can adjust the granule distribution according to requirement, purpose and desired geometry of the filter element.

Thus the filter medium, either in the direction of filtration, or perpendicular to it, can have a progression of the mean diameter of the granules from fine to coarse or from coarse to fine.

Also progressions of the mean diameter of the granules from fine via coarse to fine or from coarse via fine to coarse can be freely selected.

By fine is to be understood a mean diameter of the granules of 0.1 to 3 mm, by coarse from 3 to 30 mm.

The filter media according to the invention are manufactured in that one selects the spherical granules homogeneously or in mixture of solid spherical, hollow spherical and/or broken granules with reference to their diameter and if necessary mixes them.

By distribution of granules one can define the porosity, that is to say the proportion of space, which is available for the material to be filtered, and thus also the permeability.

The granules or the granule mixture, as the case may be, are mixed with the inorganic binder and a medium which binds and pre-hardens on heating, to produce a sufficient green strength. Preferably one pre-mixes the chemical or ceramic binder and the pre-hardener medium, and only then mixes in the fire-resisting material.

As pre-hardener medium there come into question organic compounds, such as carboxymethyl cellulose, polyvinyl alcohols, dextrine, sulphite waste liquors, etc. and inorganic compounds, such as mono aluminum phosphate, calcium aluminate, alone or mixed together. As a rule the pre-hardener medium works in aqueous solution.

The pre-hardener medium has the purpose to impart binding or adhesive properties to the individual granules at the beginning, and to produce from the granule mixture a formable mass up to the final firing. As a rule the mixture of granules, if necessary, the binder and the pre-hardener medium is mixed with water in a known manner, such as by milling or stirring.

The shaping of the mixed mass can take place by various methods such as stamping, jigging or casting in a mold, uniaxial or isostatic pressing or by extrusion. A drying process is carried out in dependence on the kind and composition of the medium, as a rule at 80° to 100° C., and produces a good green strength of the shaped body after at the latest 24 hours.

The ceramic firing takes place in a gas or electric oven at temperatures which are dependent on the kind of binder, and also in dependence on the composition of the fire-resistant material. For filter media whose granule mixture is bonded chemically, temperatures around 1000° C. are sufficient, for granule mixtures which are bonded by glass, temperatures between 700° and 1600° C. must be maintained. For the case in which a self-bonding by sintering is aimed at, the firing temperature is adjusted according to the individually known sintering ranges of the fire-resistant material, but reaches a maximum of 2000° C.

According to the method of the invention the cycle cold-to-cold amounts as a rule to less than 48 hours. By the cold-to-cold cycle is understood the period in which the green body is heated from room temperature to the maximum firing temperature and is cooled down again to room temperature.

This short baking period is explainable in that the spherical granules within the granule mixture create no heat stresses or only very slight ones, and thus lead to very strong fired bodies. The binder and pre-hardener medium vaporizes or burns away completely without residue, at the latest during the baking process.

The construction of the filter medium according to the invention already corresponds in the green condition to a closest packing of the spheres. In this way is attained a minimization of the contraction usually occurring in the sintering of refractory materials because of tranpositions and diffusion processes.

Filter media manufactured according to the invention are employed for filtration of molten metals. In a preferable embodiment the filter media according to the invention are employed for filtering of molten aluminum or iron.

The filtration of molten copper, copper alloys, grey iron, titanium, etc. is likewise possible.

According to the melting point and the filtration temperature of the metal, the choice must be taken of the heat resistant material and of the inorganic binder.

Filter elements can be manufactured in almost any desired shape and size. With the employment of hollow spherical granules relatively low specific gravities are however attained, so that even large filter elements are self-supporting and resistant to thermal change. When employing hollow spheres in the filter plate the apparent density of the filter plate should be between 16 to 25 percent of the ceramic granules. The width to thickness ratio should be from about 1:1 to 25:1. A 17×17×1 inch filter in accordance with the present invention would weigh about 4.00 kg or 40% of that of a filter manufactured in accordance with U.S. Pat. No. 4,278,544. A preferred embodiment is that the filter medium has the form of a plate with bevelled edge surfaces. Such a plate can for example be installed in place of a filter plate such as is described in Swiss Pat. specification No. 622 230.

Besides filter plates, also filter tubes, filter pots and filter blocks can easily be manufactured.

EXAMPLE 75 kg hollow spherical corundum of granule size 1.6–2.0 mm were intensively mixed in an intensive mixer with a mixture of 15 kg glaze raw mixture and 10 l carboxymethyl cellulose solution for 2 min. The glaze raw mixture consisted of 30% $SiO_2$, 30% pot ash feldspar, 15% calcium carbonate, 5% calcium silicate, 17% kaolin and 2.5% alumina, in a grain size of smaller than 60 micron. The bulk density of this glaze raw mixture amounted to 1.5 kg/l. The mixture of hollow spherical corundum, raw glaze and carboxymethyl cellulose had a dry consistency. A part of this mixture was jigged into prepared metal frames of size 30×30×5 cm with bevelled walls and smoothed on the surface with a metal roller. The metal frames together with the ceramic material, were thereupon placed in an electric drying oven and dried for 24 hours at 80°–100° C. After the drying the ceramic material could be removed, and had a self-supporting consistency with good strength at the edges.

Thereupon the raw filters were placed in an electric oven and fired to a maximum of 1280° C. The holding time amounted to 10 minutes, the heating up and cooling rate amounted to about 100° C. per hour—the linear shrinkage amounted to 0%.

The fired filters exhibit the following characteristics:
Color: white

Volume: 4.3 l
Weight: 3.0 kg
Bulk density: 0.7 kg/l
Permeability, measured according to DIN 51 058: 14–16 Microperm (μPm)
Bending strength, measured on 15 test bars of 25×25×100 mm with support radius 14 mm, support spacing 50 mm determined according to the 3 point method: 230±50 N/cm²
Cold compression strength: 410±50 N/cm²
Edge strength: good A filter manufactured in the described manner was installed in a prepared filter trough, as is described in Swiss Pat. specification No. 622 230, and preheated with direct gas flame to about 400° C. An aluminum alloy with the identification AlMg 0.4 Si 1.2 was now supplied at a rate of flow of 75 kg/min. The metal temperature amounted to 700° C. The depth of metal above the filter plate amounted to 400 mm, the pressure difference of inlet and outlet at the beginning of casting 20, at the end 27 mm. The depth of metal above a filter according to U.S. Pat. No. 3,524,548 in a comparative experiment amounted to 600 mm, the pressure difference at the beginning 30 mm, at the end 40 mm.

In total 12 t of metal were cast in rolling bars in the format 318×1250×3100 mm. This occurred by three pourings through a filter plate according to the invention. Between the pourings the filter was held at its temperature by flame heating.

At the end of casting the filter loaded with metal was removed and after cooling was cut up and examined metallographically. Then it appeared that the impurities in the form of magnesium-aluminum oxides were deposited throughout the entire filter especially in the zones between the abutting spheres, as well as in the uppermost zone of the filter plate. The titanium diboride added as grain refining means could be identified as accumulated on the surface of the spheres. The space occupied by the aluminum in this filter was determined, in order to obtain a measure for the homogeneous penetration of the filter by the metal. The space occupied by the aluminum after correction for the volume component taken up by the filter material itself, but without regard to the portion in hollow spheres not accessible to the aluminum, was determined as 82%. In contrast to this the degree of space occupation in a filter according to Swiss Pat. specification No. 622 230 with an analogous pore size 40 ppi (pore per inch) was determined at 55%.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A filter plate constructed and arranged for filtering molten metal in the form of a stable porous body of hollow spherical ceramic granules of fire-resistant material which are bonded together, said granules having a mean diameter of from 0.5 mm to 8 mm and are thermally bonded together such that the surface area of the point contact between any two granules is from 0.1% to 1.5% the surface area of the granules, said filter plate being characterized by a width to thickness ratio of from 1:1 to 25:1, an apparent density of 16 to 25 percent the density of the ceramic material, a through flow porosity of 20 to 35 percent by volume and a permeability of 10 μPm to 30 μPm.

2. A filter according to claim 1 wherein said spherical shaped granules are formed in part of a material selected from the group consisting of aluminum oxide, corundum, bauxite, zirconium and spinels.

3. A filter according to claim 1 wherein said spherical shaped granules are bonded together by their own material.

4. A filter according to claim 1 wherein said spherical shaped granules are bonded together by an inorganic binder.

5. A filter according to claim 1 wherein the surface of said spherical shaped granules is coated with active aluminum oxde.

6. A filter according to claim 5 wherein said aluminum oxide is 3% to 40% by weight of the total filter.

7. A filter according to claim 1 wherein the surface of said spherical shaped granules is coated with a flux material.

8. A filter according to claim 7 wherein said flux material is 0.5% to 10% by weight of the total filter.

9. A filter accoding to claim 1 wherein ceramic fibers are contained in the fire-resistant material in quantities of 0.015 to 10% by weight of the fire-resistant material, said ceramic fibers extending out beyond the surface of the fire-resistant material.

10. A filter according to claim 1 wherein ceramic fibers are contained in the fire-resistant material in quantities of 0.1 to 5% by weight of the fire-resistant material, said ceramic fibers extending out beyond the surface of the fire-resistant material.

11. A filter according to claim 1 wherein ceramic fibers are contained on the granule surface in quantities of 0.01% to 10% weight of the fire-resistant material, said ceramic fibers extending out beyond the surface of the fire-resistant material.

12. A filter according to claim 1 wherein ceramic fibers are contained on the granule surface in quantities of 0.1% to 5% by weight of the fire-resisant material, said ceramic fibers extending out beyond the surface of the fire-resistant material.

13. A filter according to claim 1 wherein the surface of said spherical shaped granules is coated with carbon.

14. A filter according to claim 5 wherein said carbon is 3% to 40% by weight of the total filter.

15. A filter according to claim 1 wherein said filter medium has a progression of the medium diameter of the granules from fine to coarse in the direction of filtration.

16. A filter according to claim 1 wherein said filter medium has a progression of the mean diameter of the granules from coarse to fine in the direction of filtration.

17. A filter according to claim 1 wherein said filter medium has a progression of the mean diameter of the granules from coarse to fine perpendicular to the direction of filtration.

18. A filter according to claim 1 wherein said filter medium has a progression of the mean diameter of the granules from fine to coarse perpendicular to the direction of filtration.

* * * * *

UNITED STATES PATENT AND TRADEMARK OFFICE
CERTIFICATE OF CORRECTION

PATENT NO.   : 4,690,763

DATED        : September 1, 1987

INVENTOR(S)  : Wolfhart Rieger et al

It is certified that error appears in the above-identified patent and that said Letters Patent is hereby corrected as shown below:

Column 1, line 17, "first" should be --fired--.

Column 1, line 19, after "has" change "a" to --as--.

Column 2, line 21, change "filtered" to --filtering--.

Column 3, line 29, delete "on".

Column 3, line 46, change "Once" to --One--.

Column 7, line 8, after "50 mm" insert --,--.

Column 8, claim 5, line 18, change "oxde" to read --oxide--.

Column 8, claim 9, line 28, change "0.015" to read --0.01--.

Column 8, claim 11, line 38, before "weight" insert --by--.

Column 8, claim 15, line 51, change "medium", second occurrence, to --mean--.

Signed and Sealed this

Twelfth Day of January, 1988

Attest:

DONALD J. QUIGG

Attesting Officer

Commissioner of Patents and Trademarks